Nov. 22, 1955

R. L. HOLCOMB 2,724,303

DRIVER FASTENER HAVING COATING
OF ELASTIC INSULATING MATERIAL
Filed March 29, 1950

INVENTOR.
Robert L. Holcomb
BY
ATTORNEY

United States Patent Office 2,724,303
Patented Nov. 22, 1955

2,724,303

DRIVER FASTENER HAVING COATING OF ELASTIC INSULATING MATERIAL

Robert L. Holcomb, Fairfield, Conn.

Application March 29, 1950, Serial No. 152,624

1 Claim. (Cl. 85—10)

This invention relates to new and useful improvements in fasteners of various types as nails, screws, etc.

An object of the invention is to provide a fastener having on the shank thereof a coating adapted to peel back along the shank of the fastener as such shank is driven into an object whereby when the fastener is driven, the material comprising the coating is concentrated about that portion of the shank immediately under the fastener head and provides a seal between the fastener head and the object into or through which the fastener shank has been driven and also forms a seal between the shank and the hole formed by the latter as it is driven.

Another object is to provide a fastener as stated and wherein the mentioned coating comprises an elastomer whereby the same will maintain an effective seal under varying temperature conditions leading to expansion and contraction of the object into or through which the fastener shank is driven.

Another object is to provide a fastener having the characteristics indicated and wherein the peeled back coating material is a dielectric and serves not only as a water and moisture seal under the head of the fastener and about the shank, where it penetrates an object, but will also provide an electrical insulator between the fastener head and the portion of the shank adjacent the fastener head and a metal sheathing or the like through which the fastener has been driven.

Metal sheathing of aluminum has come into wide usage and in applying the same it is desirable that the securing elements or fastening elements employed, such as nails, screws, etc., be electrically insulated from the aluminum to avoid electrolytic action. Also, it is desirable in these structures that an efficient and thorough sealing means be provided to prevent entrance of moisture under the heads of the fasteners and which moisture is likely to penetrate the sheathing about the fastener shanks and through the holes or openings formed in the sheathing as the fasteners are driven. Additionally, due to temperature changes, there is an expansion or contraction of the sheathing and it is desirable that the sealing means mentioned be an elastomer or be compressible. This is to allow for such expansion without the loosening of the fastener in the under material into which they have been driven and whereby the seal remains effective by expansion of the sealing means on contraction of the sheathing.

Other objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claim.

Figure 1:
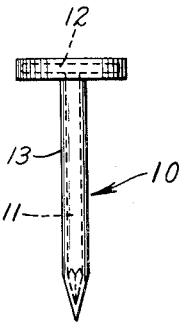
Fig. 1 is a side elevational view showing a nail constructed in accordance with the invention.
Figure 2:
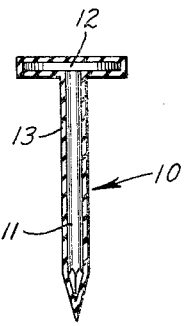
Fig. 2 is a longitudinal sectional view through the coating of such nail.

Referring in detail to the drawing, and at first particularly to Figs. 1 and 2 thereof, the fastening element of the invention as exemplified in an improved nail is generally designated 10 and the same includes a shank 11 and an integral head 12. Shank 11 may be of the desired cross section, size, etc. and is formed of iron, aluminum, steel, or any other desired metal.

Over the entire nail 10, i. e., over both the shank and head of the nail 10, is a coating 13. This coating is of a material which will peel or roll back from the shank of the fastener as the latter is driven into or through a means or object and will leave such fastener shank free of the coating whereby the coating all accumulates at the underside of the fastener head and between the latter and the object or means into or through which the fastener shank is driven. From this it will be understood that the coating material is soft and is merely over and supported by the fastener shank and that the coating material is not tightly adhered or bonded to the fastener. Thus, the material constituting the coating may be of various kinds. However, to maintain a seal under varying conditions of temperature and where an electrical insulator is desired, a suitable elastomer of either natural or synthetic material is employed. The coating is applied while in a liquid or paint-like state and may be a latex or may have been reduced to a liquid state by a suitable solvent or plasticizer, etc. Preferably, the coating is chlorinated rubber although I am not limited to the use of such material.

Since the coating covers the entire nail it may be applied by dipping, spraying, brushing, tumbling, or the like. The coating should be as uniform as is reasonably possible and, for an effective seal under conditions of varying temperature, of a material which retains "life" properties over a long period of time when exposed to the atmosphere or under conditions where it is not protected by hermetic sealing. By properties of "life" I wish to convey the thought that the material does not readily dry out and become hard and brittle and frangible.

Figure 9:
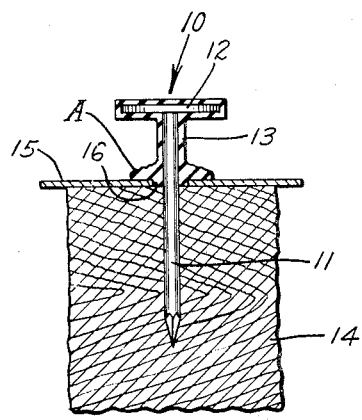
Fig. 9 is a sectional view showing a nail of the invention when partly driven.
Figure 10:
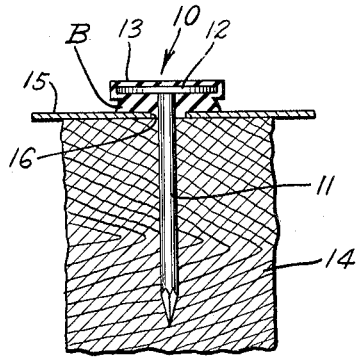
Fig. 10 is a similar view showing the nail wholly driven.

Figs. 9 and 10 illustrate the manner of use of that embodiment of the invention comprising the nail of Figs. 1 and 2. In such Figures 9 and 10, 14 is wood, as the siding of a building or the like. The same is covered by metal sheathing 15 which may be aluminum, copper, tin, etc. As the shank 11 of the nail is driven through the sheathing 15, a hole or opening 16 is formed in the latter. As the nail shank is driven inwardly, the elastomer coating 13 is entirely peeled back from the part of the shank penetrating the wood.

Thus, in Fig. 9, the partly driven nail is illustrated and it is noted that the portion of the shank 11 below the sheathing 15 has all of the elastomer coating peeled or rolled back therefrom. This elastomer coating, as it peels or rolls back accumulates as a homogeneous elastic laterally thickened annular mass at the upper side of the sheathing 15 and in the hole 16 which the nail has formed in the sheathing and about the nail shank 11 as suggested at A in Fig. 9. Therefore it will be understood that my coating material must be flexible and capable of rolling or peeling back to accumulate in a rather homogeneous body and must be non-frangible so as not to crack or crumble and fall apart. There is some enlarging of the opening 16 through the sheathing, and a portion of the coating material accumulates in the opening and helps fill the same about the shank 11 of the nail.

As the driving of the nail continues, the coating material continues to peel or roll back along the nail shank and in the final home position of the nail, as in Fig. 10, this material is all accumulated under the head of the nail as at B. The material is entirely about the nail shank and is shown as partly entered into opening 16 completely filling said opening about the nail shank and completely insulating the nail shank as well as the head of the nail from the sheathing. From this, it will be understood that the coating is applied to the nail shank in such quantity as to provide the desired accumulation B when the nail is driven home. Preferably, this accumulation completely fills the space about the upper portion of the nail shank and between the underside of the nail head and the sheathing.

When the accumulation B is of a live material, i. e., a material which is rubber-like and compressible and expansible, it will be understood that expansion of the sheathing under heat may serve to further compress accumulation B and will not loosen the nail in the wood 14. Then, as the sheathing cools the accumulation B will expand toward its natural state and will continue to completely fill all space at the underside of the nail head and about the nail shank, between the latter and edges of opening 16 through the sheathing. Thus under all conditions, the accumulation B, when of an elastomer, forms an effective weathertight seal under the nail head and about the nail shank and between the nail and the sheathing. This elastomer being dielectric, no electrolytic action will be set up between the nail and the sheathing.

I have illustrated the nail 10 as completely coated and while the coating on the upper side and edges of the nail head does not enter into the sealing action described, such portion of the coating does have a purpose. Where these nails are driven through colored material as, for example, if sheathing 15 is colored or if some colored coating is applied thereto, the coating on the nail head may be of a colored material to correspond with that of the coloring on the sheathing. Additionally, if the nail is used through composition shingles or the like, the coloring of the coating on the nail head will correspond with the coloring of such shingles, where that is desired. On the other hand, the coloring of the coating on the nails may be in contrast with the coloring of the material through which the nails are driven.

Figure 3:
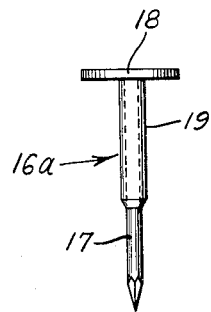
Fig. 3 is a side elevational view showing a slightly modified construction of nail.
Figure 4:
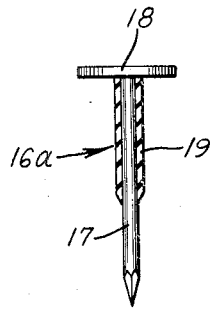
Fig. 4 is a view similar to Fig. 2 but through the nail of Fig. 3.

Referring next to the nail of Figs. 3 and 4, such nail is generally designated 16a and the same includes a shank 17 and an integral head 18. These parts are of metal. On the upper portion of the shank 17 is a coating 19 which is not bonded to the shank and may peel or roll back therealong as the nail shank is driven into or through an object. This coating has the characteristics of the coating first described and may, for example, be the elastomer described in connection with Figs. 1 and 2. The coating 19 is only over a portion of the shank of the nail and is not at all on the head of the nail. The amount or volume of coating required determines its thickness and length along the nail shank. There should be sufficient coating whereby when it is accumulated under the fastener head it forms a seal between the underside thereof and the sheathing and about the extreme upper portion of the fastener shank.

The coating is of a nature to skin or peel back as the nail is driven and to function in the manner of the coating 13 of nail 10 and as illustrated for such coating in Figs. 9 and 10. However, in the modified structure, the natural nail head remains exposed. The coating of the nail of Figs. 3 and 4 may be accomplished in the desired manner, preferably as by spraying or brushing.

Figure 5:
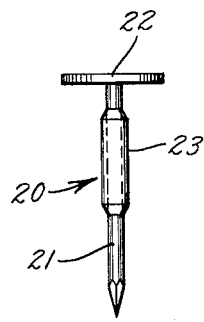
Fig. 5 is a view similar to Fig. 2 but showing another slight modification.
Figure 6:
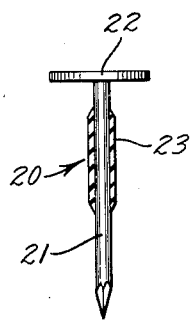
Fig. 6 is a longitudinal sectional view through the coating of the nail of Fig. 5.

In Figs. 5 and 6, the nail is generally designated 20 and the same includes a shank 21 and a head 22. On an intermediate portion of the shank 21 is a coating 23, in the form of a band of the elastomer and this coating is of any of the materials previously indicated as forming the coating of the fasteners of Figs. 1-4 and in the same quantity or volume and such as will peel or roll back along the nail shank as the latter is driven.

From this, it will be understood that coating 23, as in the cases of the coatings previously described, is free of the shank in that it is only supported thereby and is not tightly adhered or bonded thereto. As in the instances of the coating first described, the coating 23 is also soft and flexible and not such as to crack and crumble.

When such a nail 20 is driven, the coating material 23 will be peeled or rolled back and accumulate under the nail head and about the shank portion immediately under the nail head so as to form a seal as indicated by the accumulation B of the coating of the nail 10 in Fig. 10.

Figure 7:
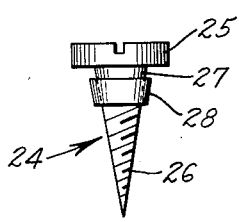
Fig. 7 is a side elevational view of a wood screw incorporating the invention.

Fig. 7 shows the fastener of the invention as embodied in a wood screw. There the screw, generally designated 24, is shown as including a head 25, a shank including a pointed end and a lower threaded portion 26 and an upper unthreaded, smooth portion 27 immediately under the head 25. On this smooth portion 27 is a coating 28 of the character and in the volume of the coatings previously described. In use, as the screw 24 is threaded home, the coating 28 is rolled or peeled back and accumulates at the underside of the head 25 and about the extreme upper portion of the shank of the screw. The accumulation of coating material functions as in the case of the nails of Figs. 1-6.

Figure 8:
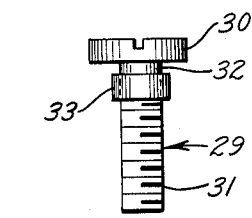
Fig. 8 is a similar view showing the invention as embodied in a machine screw.

In Fig. 8 is shown a machine screw made in accordance with the invention. This machine screw, generally designated 29, includes a head 30, a lower threaded shank portion 31 and an upper smooth or unthreaded shank portion 32 immediately under the head of the screw. On shank portion 32 is a coating 33 of the volume and character and for the same purpose as the coatings previously described in connection with the nails of the first six figures of the drawing. This machine screw is employed in the usual manner and when threaded home, the coating material peels or rolls back or up along the screw shank and accumulates at the underside of the screw head.

In the various figures of the drawing the coating is shown of an exaggerated thickness. Actually, the coating, in most instances, is a skin or film of only slight thickness. Additionally, in each instance, this coating is of a relatively soft and flexible material and merely lies on the surface of the nail shank being but slightly adhered thereto. This last is in order that the coating will peel or roll back along the nail shank in a single piece or as a homogeneous structure and will not crack and break into pieces as it strips or rolls back along the fastener shank when the latter is being driven—as by blows or with a screw driver or other tool—home.

The volume of the coating material is calculated whereby to be in sufficient amount for the intended purpose. when accumulated under the head of the fastener. For different purposes of use of the fastener, more or less coating material will be needed and it may be a thin coat distributed along the length of the shank or a thicker coat on a portion only of the shank, etc. Where a dielectric is required between the fastener and a piece of sheathing or another object or part into which or through which the fastener enters or passes, then the coating will preferably be a natural or synthetic elastomer as rubber, a butadiene product, vinyl, although where not exposed to moisture, other materials both natural and synthetic may be used.

Having thus set forth the nature of my invention, what I claim is:

A fastener for driving through sheathing of metal or the like into a wood or like structure covered by said sheathing including an elongated shank of uniform cross-section having a sheathing perforating and wood penetrating pointed lower end and an enlarged head on the upper end of said shank having a substantially flat under side, said shank when driven adapted to produce an opening in said sheathing enlarged relatively to said shank and a passage in said wood or like structure in which said shank is tightly gripped by the displaced wood or the like forming the wall of said passage, a coating covering said entire fastener, said coating comprising a soft flexible non-frangible homogeneous elastic material in the form of a thin film of substantially uniform thickness on said fastener having the properly of remaining homogeneous under deformation, its softness being substantially greater than wood and its adherence to said shank being of such an order that said coating is incapable of remaining in adherence with said shank as the latter is driven into wood, whereby as said shank is driven through sheathing into wood said coating is entirely peeled from the wood penetrating part of said shank upwardly toward said head and accumulates about said shank between said head and said sheathing as a homogeneous laterally thickened annular mass compressed between the under side of said head and the upper side of said sheathing and extending into the enlarged opening in said sheathing in surrounding relation to said shank whereby said shank and head are entirely insulated from said sheathing.

References Cited in the file of this patent

UNITED STATES PATENTS

| | | |
|---|---|---|
| 2,203,294 | Engle | June 4, 1940 |
| 2,226,006 | Maze | Dec. 24, 1940 |
| 2,326,455 | Gray | Aug. 10, 1943 |
| 2,353,110 | Camp | July 4, 1944 |
| 2,353,248 | Lamb | July 11, 1944 |
| 2,439,516 | Holcomb | Apr. 13, 1948 |
| 2,464,381 | Donaldson | Mar. 15, 1949 |